United States Patent Office 2,923,686
Patented Feb. 2, 1960

2,923,686

GLYCOL ANTIFREEZE MIXTURES

Edward O. Ohlmann, Bay City, Mich., assignor to The Dow Chemical Company, Midland, Mich., a corporation of Delaware No Drawing. Application May 23, 1955
Serial No. 510,576

7 Claims. (Cl. 252—74)

This invention relates to glycol anti-freeze concentrates, and to aqueous solutions and dispersions thereof having decreased foaming properties.

The glycol anti-freeze concentrates of the present invention are particularly adapted for admixture with water for use as heat exchange media in the circulating systems of internal combustion engines, especially in the cooling systems of automobile engines, and in such use are substantially non-foaming.

The novel non-foaming concentrates within the scope of the invention comprise a major proportion of a glycol from the class consisting of ethylene glycol and propylene glycol, and mixtures thereof, together with a small though effective proportion of a foam suppressing product consisting of tri(hydroxy-polyoxyalkylene) ethers of glycerol.

Suitable tri-(hydroxy-polyoxyalkylene) ethers of glycerol in accordance with the invention are those in which the glycerol nucleus is substituted by three hydroxy-polyoxyalkylene ether chains each of which consists of a polyoxypropylene ether portion adjacent to the glycerol nucleus and a hydroxy-polyoxyethylene portion remote therefrom.

These compounds are prepared by first condensing propylene oxide with glycerol to form an intermediate propylene oxide-glycerol condensation product characterized by having three hydroxy-polyoxypropylene chains attached to the glycerol nucleus, one at the site of each glycerol oxygen atom. Condensation is carried out until at least 30, and preferably from 40 to 80 parts by weight of propylene oxide are reacted per part by weight of glycerol. The intermediate propylene oxide-glycerol condensation product is then reacted with ethylene oxide, thereby etherifying each polyoxypropylene chain at the site of the terminal hydroxy group and building up a hydroxy-polyoxyethylene chain on each. This reaction is continued until from about 0.1 to about 0.4 of a part by weight of ethylene oxide has been reacted per part by weight of the intermediate material. The glycerol-alkylene oxide condensation reaction is best carried out under substantially moisture-free conditions at an elevated temperature in the presence of any of the usual condensation catalysts, an alkali metal hydroxide or alkoxide being preferred.

The products so prepared are, for the most part, a complex mixture of tri(hydroxy-polyoxyalkylene) ethers of glycerol in which the lengths of the hydroxy-polyoxyalkylene chains vary considerably from one molecule to another in the mixture. In other words, a given product, having some particular viscosity, and hence a definite average molecular weight, is actually a complex mixture of species with a considerable spread in individual molecular weights. Since the three hydroxy-polyoxyalkylene chains attached to each glycerol nucleus are probably not alike in length, these compounds are best defined by the following general formula:

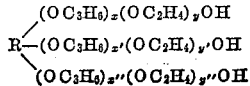

wherein R is a glyceryl radical; the sum of $x$, $x'$, and $x''$ represents the average number of oxypropylene groups in the compounds of the mixture; the sum of $y$, $y'$, and $y''$ represents the average number of oxyethylene groups in the compounds of the mixture; the values of $x$, $x'$, $x''$ and $y$, $y'$, and $y''$ being such that there is an average of at least 54, and preferably from 72 to 195 oxyalkylene groups per glyceryl radical; and the values of $x$, $x'$, and $x''$ being such that there is an average of at least 48, and preferably at least 63 oxypropylene groups present constituting from about 66 to 89 mole percent of the total oxyalkylene groups.

These polyoxyalkylene products are virtually non-volatile, water-white to amber liquids which are highly soluble in benzene and a wide variety of liquid aromatic compounds. They are also soluble in aliphatic and cycloaliphatic solvents such as acetone, carbon tetrachloride, ethanol, cyclohexanol, and the like, but are only slightly soluble to insoluble in water. These liquid products are stable in air, do not deposit gummy residues on heating, and are not corrosive to metals. As previously stated, these compounds prevent foaming frequently encountered in the circulation and mechanical mixing of aqueous glycol solutions, especially heated solutions.

Within the limits of the reactant ratios hereinbefore set forth, these products, viz. tri(hydroxy-polyoxyalkylene) ethers of glycerol, have for the most part average molecular weights of from about 1700 to about 5000 as calculated from the weight percent of hydroxyl (as determined by acetylation) and reckoning three free hydroxyl groups per molecule. Expressing this in another way, the average molecular weight of the glycerol-polyoxypropylene portions of these products as determined by hydroxyl prior to oxyethylation should be at least 1500, and is preferably in the range of from about 2200 to about 4000. The viscosities of these products are usually greater than 250 centistokes at 100° F. and may exceed 800 centistokes at 100° F. A detailed description of these products, and of their manufacture and use, is given in application Serial No. 396,773, filed December 7, 1953 by M. E. Pruitt et al.

In the non-foaming concentrates of the invention, the glycol component usually constitutes greater than 80 percent by weight thereof. As previously stated, the glycol component may consist entirely of monoethylene glycol or of monopropylene glycol. The monoglycol component may also consist of a mixture of the monoglycols of ethylene and of propylene in any proportion whatever. In addition to the monoglycols, one or both of the diglycols may also be present in the concentrate in small proportions, usually less than 10 percent by weight.

In addition to the glycol component, the anti-freeze concentrates of the invention contain a minor proportion of less than 10 percent by weight of one of the aforesaid tri-(hydroxy-polyoxyalkylene) ethers of glycerol as an antifoam agent. Such a compound, or mixture of compounds, is surprisingly effective in exceedingly low concentrations in suppressing foaming of aqueous glycol anti-freeze compositions, e.g. the tri(hydroxy-polyoxyalkylene) ethers of glycerol may be effectively employed in concentrations as low as 0.001 weight percent based on the glycol component. Ordinarily, however, at least 0.01 percent of the said tri(hydroxy-polyoxyalkylene) glycerol compound is used, best results being obtained with from 0.01 to 1.0 weight percent thereof based on the glycol component.

Upon admixing water with the novel anti-freeze concentrates in accordance with the invention, a substantially non-foaming anti-freeze composition for use as a heat exchange media in automobile radiators is obtained. In normal usage, the greater the proportion of the concentrate to water, the lower the freezing point of the resultant radiator liquid. Thus, an aqueous anti-freeze composition containing 30 percent by weight of the concentrate has a freezing point of about −15° C., while a composition of 60 percent concentration freezes at about −50° C. Ordinarily no greater than a 50 weight percent aqueous anti-freeze composition freezing at about −35° C. is required for use in automobile radiators.

To render the above aqueous anti-freeze compositions substantially non-corrosive to automobile circulating systems, it has been found highly desirable to add a small amount of a corrosion inhibitor, potassium dibasic phosphate being particularly effective in such use in an amount in the range of from about 0.5 to 5.0 percent by weight based on the glycol. For good corrosion inhibition, about 2 percent $K_2HPO_4$ (based on the glycol) is both a practical and effective amount to employ.

It is also desirable to incorporate in the aqueous anti-freeze composition, a water-insoluble, water-repellent material which will coat out on the internal surfaces of automotive cooling systems and prevent leakage of the liquid coolant. A light mineral oil or petroleum fraction is suitable for such use, usually from 0.1 to 1.0 percent by weight based on the glycol.

In preparing aqueous anti-freeze compositions in accordance with the invention, an anti-freeze concentrate is first prepared and then diluted with water in an amount required to give the freezing point desired. A typical anti-freeze concentrate, for example, is conveniently made up by first dissolving 2 parts by weight of $K_2HPO_4$ in 2.4 parts water and then dissolving the resultant solution in 95 parts by weight of a glycol consisting approximately of 90 percent of monoethylene glycol, balance diethylene and monopropylene glycols. To this phosphate containing glycol solution is then added 0.1 part by weight of one of the aforesaid tri-(hydroxy-polyoxyalkylene) ethers of glycerol, and 0.5 part of Indoil No. 12, a light mineral oil. The anti-freeze concentrate so prepared, upon dilution with water, is a highly effective, substantially non-foaming anti-freeze composition for use in the cooling systems of internal combustion engines.

*Example*

This example clearly illustrates the substantially non-foaming characteristics of several aqueous glycol anti-freeze compositions according to the invention.

The aqueous glycol anti-freeze compositions employed in the following tests were prepared by adding equal volumes of water to five different anti-freeze concentrates consisting of different concentrations of the trihydroxy-polyoxyalkylene glycerol product as hereinafter described admixed with a glycol base material consisting approximately of 90 weight percent monoethylene glycol, balance monopropylene and diethylene glycols. The aforesaid trihydroxy-polyoxy-alkylene glycerol product was prepared in accordance with the procedure set forth in the specification by first reacting one part by weight of glycerol with approximately 65 parts of 1,2-propylene oxide, and then reacting 0.20 part by weight of ethylene oxide per part of the intermediate glycerol-1,2-propylene oxide condensation product. The average molecular weight of the intermediate glycerol-1,2-propylene oxide condensation product prior to oxyethylation was greater than 3000 as determined by hydroxyl analysis.

The tests were carried out in a glass tube four feet in length and one and five-eights inches inside diameter. The glass tube was fitted at its base with a medium porosity glass frit which was connected to an adjustable air supply line. A 200 ml. sample of the aqueous glycol anti-freeze composition to be tested was introduced into the glass tube and air was passed through the glass frit and into the anti-freeze test composition at a rate such as to produce maximum foam. The results of the tests are expressed in inches of foam and are given in the following table opposite the concentrations of the foam suppressing trihydroxy-polyoxyalkylene glycerol product. These concentrations are given in percent by weight based on the glycol base component of the anti-freeze concentrate prior to admixture with water.

| Trihydroxy-Polyoxyalkylene Glycerol Product, Weight Percent | Foam Height, Inches |
|---|---|
| None | 48 |
| 0.01 | 1¾ |
| 0.022 | 1⅛ |
| 0.047 | ⅝ |
| 0.061 | ⅝ |
| 0.1 | ½ |

That which is claimed is:

1. An anti-freeze concentrate consisting essentially of a major proportion of a monoglycol from the class consisting of ethylene glycol and propylene glycol together with from .001 to 10 percent by weight of a foam suppressing product consisting of a mixture of tri(hydroxy-polyoxyalkylene) ethers of glycerol in which the polyoxyalkylene ether chains consist of a polyoxy-1,2-propylene portion adjacent to the glycerol nucleus and a polyoxyethylene portion remote therefrom, there being an average of from 54 to about 195 oxyalkylene groups per glycerol nucleus of which there are an average of at least 48 oxy-1,2-propylene groups present constituting 66 to 89 mole percent of the total oxyalkylene groups.

2. An anti-freeze concentrate according to claim 1, the average molecular weight of the glycerol-polyoxy-1,2-propylene portions of said ethers being at least 1500 as determined from the hydroxyl number.

3. An anti-freeze concentrate consisting essentially of a major proportion of a monoglycol from the class consisting of ethylene glycol and propylene glycol and containing from .01 to 10 percent by weight of a mixture of tri-(hydroxy-polyoxyalkylene) ethers of glycerol in which the polyoxyalkylene ether chains consist of a polyoxy-1,2-propylene portion adjacent to the glycerol nucleus and a polyoxyethylene portion remote therefrom, there being an average of from about 72 to 195 oxyalkylene groups per glycerol nucleus of which there are an average of at least 63 oxy-1,2-propylene groups present constituting from 66 to 89 mole percent of the total oxyalkylene groups.

4. An anti-freeze concentrate according to claim 3, the average molecular weight of the glycerol polyoxy-1,2-propylene portions of said ethers being at least 2200 as determined from the hydroxyl number.

5. An aqueous anti-freeze composition consisting essentially of a mixture of water and a monoglycol from the class consisting of ethylene glycol and propylene glycol as the main constituents and containing in addition thereto, from .01 to 10 percent by weight, based on the monoglycol, of a mixture of tri(hydroxy-polyoxyalkylene) ethers of glycerol, said polyoxyalkylene compounds containing in their structure oxyethylene groups, oxypropylene groups, and a glyceryl radical, said polyoxyalkylene compounds being characterized in that the oxypropylene groups are present in polyoxypropylene chains that are attached to the glyceryl radical, one polyoxypropylene chain being attached to each carbon atom of the glyceryl radical, thereby constituting a polyoxypropylene glyceryl polymer portion, the oxyethylene groups being present in hydroxy-polyoxyethylene chains, one hydroxy-polyoxyethylene chain being attached to the end of each polyoxypropylene chain, the average molecular weight of the polyoxypropylene glyceryl polymer portions in the compounds of the mixture being from 1500 to about 4000 as determined by hydroxyl number, and the oxyethylene groups being present in an amount equal to from 0.1 to 0.4 part by weight of the polyoxypropylene glyceryl polymer portions.

6. An aqueous anti-freeze composition according to claim 5 wherein the average molecular weight of the polyoxypropylene glyceryl polymer portions in the polyoxyalkylene compounds of the mixture is in the range of from about 2200 to about 4000 as determined by the hydroxyl number.

7. An aqueous anti-freeze composition according to claim 5 containing from 0.5 to 5.0 percent by weight, based on the monoglycol, of potassium dibasic phosphate.

References Cited in the file of this patent

UNITED STATES PATENTS

| | | |
|---|---|---|
| 2,657,181 | Van Horn et al. | Oct. 27, 1953 |
| 2,665,312 | Ohlmann | Jan. 5, 1954 |
| 2,671,811 | Baird | Mar. 9, 1954 |
| 2,674,619 | Lundsted | Apr. 6, 1954 |
| 2,695,892 | Jaccard | Nov. 30, 1954 |
| 2,727,009 | Jursich | Dec. 13, 1955 |
| 2,727,867 | Denman | Dec. 20, 1955 |
| 2,757,142 | Ryznar | July 31, 1956 |